(12) United States Patent
Jang (10) Patent No.: US 11,447,123 B2
(45) Date of Patent: Sep. 20, 2022

(54) METHOD AND APPARATUS FOR CONTROLLING MILD HYBRID ELECTRIC VEHICLE

(71) Applicants: Hyundai Motor Company, Seoul (KR); Kia Motors Corporation, Seoul (KR)

(72) Inventor: Hwa Yong Jang, Hwaseong-Si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 287 days.

(21) Appl. No.: 16/921,569

(22) Filed: Jul. 6, 2020

(65) Prior Publication Data

US 2021/0206365 A1 Jul. 8, 2021

(30) Foreign Application Priority Data

Jan. 6, 2020 (KR) .................. 10-2020-0001241

(51) Int. Cl.
*B60W 20/14* (2016.01)
*B60W 20/40* (2016.01)
(Continued)

(52) U.S. Cl.
CPC ............ *B60W 20/14* (2016.01); *B60W 10/08* (2013.01); *B60W 20/40* (2013.01); *B60W 30/17* (2013.01); *B60W 30/18018* (2013.01)

(58) Field of Classification Search
CPC ...... B60W 20/14; B60W 10/08; B60W 20/40; B60W 30/17; B60W 30/18018; B60W 20/12; B60W 2510/244; B60W 2552/15; B60W 30/143; B60K 6/485; Y02T 10/40; Y02T 10/62; Y02T 10/70
See application file for complete search history.

(56) References Cited

U.S. PATENT DOCUMENTS

| | | | | |
|---|---|---|---|---|
| 2013/0158838 A1* | 6/2013 | Yorke | .................. | B60W 10/06 |
| | | | | 701/123 |
| 2015/0260143 A1* | 9/2015 | Yorke | ................. | F02N 11/0822 |
| | | | | 701/112 |
| 2016/0101775 A1* | 4/2016 | Gibson | ................. | B60W 20/20 |
| | | | | 903/902 |

FOREIGN PATENT DOCUMENTS

| | | |
|---|---|---|
| KR | 10-2016-0065306 A | 6/2016 |
| KR | 10-2017-0119534 A | 10/2017 |
| KR | 10-2019-0073173 A | 6/2019 |

* cited by examiner

Primary Examiner — Tyler J Lee
Assistant Examiner — Yufeng Zhang
(74) Attorney, Agent, or Firm — Morgan, Lewis & Bockius LLP (57) ABSTRACT

A method of controlling a mild hybrid electric vehicle may include determining whether a Start Stop Control (SSC) entrance condition is satisfied when a cruise mode is set; when the SSC entrance condition is determined to be satisfied by the control unit to enter an SSC mode, interrupting a supply of fuel to an engine and turning off the engine; monitoring a vehicle speed, in which when the engine is turned off, the control unit is configured to determine whether an acceleration control or a braking control of the vehicle is required based on a detection signal transmitted from a detecting unit electrically-connected to the control unit; and increasing or decreasing the vehicle speed by controlling the engine, a Mild Hybrid Starter Generator (MHSG), or an Electronic Stability Control (ESC) based on the monitoring of the vehicle speed.

18 Claims, 3 Drawing Sheets

(51) Int. Cl.
    *B60W 30/17*    (2020.01)
    *B60W 30/18*    (2012.01)
    *B60W 10/08*    (2006.01)

METHOD AND APPARATUS FOR CONTROLLING MILD HYBRID ELECTRIC VEHICLE

CROSS-REFERENCE TO RELATED APPLICATION

The present application claims priority to Korean Patent Application No. 10-2020-0001241 filed on Jan. 6, 2020, the entire contents of which is incorporated herein for all purposes by this reference.

BACKGROUND OF THE INVENTION

Field of the Invention

The present invention relates to a method and an apparatus of controlling acceleration and deceleration of a mild hybrid electric vehicle.

Description of Related Art

Due to soaring oil prices and the increasing social interest in the environment, the vehicle industry places great importance on improving fuel efficiency of a vehicle and developing environment-friendly vehicles. To the present end, the technology development on a hybrid electric vehicle (HEV) is being actively conducted.

The HEV is classified into a hard-type HEV, a middle-type HEV, and a mild-type HEV according to a power sharing ratio of an engine and a driving motor. The form in which a capacity of the driving motor is greater than a capacity of the engine is the hard type, the form in which a capacity of the driving motor is similar to a capacity of the engine is the middle type, and the form in which a capacity of the driving motor is smaller than a capacity of the engine is the mild type.

The mild-type HEV (hereinafter, referred to as the mild HEV) utilizes a 48 V battery together with a 12 V battery, being differentiated from a general HEV For example, a general HEV using a 12 V battery is difficult to cope with the flow of a vehicle change which requires an increase of an indoor display size, a dashboard changed to a digital monitor, smart phone wireless charging, mounting an autonomous driving system using a camera and various sensors, and the like. In the meantime, the mild HEV additionally mounted with a 48 V battery may be operated only with a motor of an air conditioner, so that the mild HEV may cope with the flow of the recent vehicle change, and problems in the related art caused by lower power consumption, such as the case where the vehicle does not start due to the end of the battery life in winter, may be solved.

The mild HEV adds a 48 V battery to an existing vehicle, and includes an inverter converting 48 V and 12 V, and a Mild Hybrid Starter Generator (MHSG) which starts an engine or generates power by an output of the engine, instead of an alternator mounted to an existing engine. The MHSG is a core component of the mild HEV.

In simply shaping a structure of the mild HEV, the MHSG connected to the engine through a belt assists power of the engine during acceleration and generates electricity through regenerative power generation during deceleration. The generated electricity is amplified through the inverter and is stored in each of a 48 V battery and a 12 V battery through a converter which converts a voltage, and then is utilized for driving electronic components inside the vehicle.

In the meantime, recently, there is increasing public interest in a cruise control function for improving the convenience of driving for a driver and a Start Stop Control (SSC) function configured for maximizing fuel efficiency of a vehicle.

However, there is no research on a method of combining and efficiently controlling the cruise control function and the SSC function when the cruise control function and the SSC function are simultaneously applied to a 48 V mild HEV.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method and an apparatus of controlling a mild hybrid electric vehicle, which maintain a vehicle speed by controlling a Mild Hybrid Starter Generator (MHSG), an engine, or an Electronic Stability Control (ESC) in a situation where a cruise mode and a Start Stop Control (SSC) mode are simultaneously applied in a 48 V mild hybrid electric vehicle.

Various aspects of the present invention are directed to providing a method of controlling a mild hybrid electric vehicle, the method including: determining whether a cruise mode is set according to a signal input through a driver interface; determining whether a Start Stop Control (SSC) entrance condition is satisfied when the cruise mode is set; when the SSC entrance condition is determined to be satisfied by the control unit to enter an SSC mode, interrupting a supply of fuel to an engine and turning off the engine; monitoring a vehicle speed, in which when the engine is turned off, the control unit is configured to determine whether an acceleration control or a braking control of the vehicle is required based on a detection signal transmitted from a detecting unit electrically-connected to the control unit; and increasing or decreasing the vehicle speed by controlling the engine, a Mild Hybrid Starter Generator (MHSG), or an Electronic Stability Control (ESC) based on the monitoring of the vehicle speed.

The monitoring of the vehicle speed may include when a gradient of a road on which the vehicle is travelling is equal to or greater than a predetermined angle, determining that the acceleration control is required.

The increasing or decreasing of the vehicle speed may include a first SOC investigation operation in which when the acceleration control is determined by the control unit to be required, the control unit determines whether a state of charge (SOC) value of a battery is greater than a predetermined value and thus the battery is dischargeable.

The increasing or decreasing of the vehicle speed may further include when the SOC value of the battery is greater than the predetermined value as a result of the determination in the first SOC investigation operation, determining a compensation torque according to a target increase speed and controlling the MHSG to output the determined compensation torque.

The increasing or decreasing of the vehicle speed may further include when the SOC value of the battery is equal to or lower than the predetermined value as a result of the determination in the first SOC investigation operation, releasing the SSC mode, determining the fuel amount according to a target increase speed, injecting fuel to the engine according to the determined fuel amount, and turning on the engine.

The increasing or decreasing of the vehicle speed may further include a second SOC investigation operation in which when the braking control is determined by the control unit to be required, the control unit is configured to determine whether a state of charge (SOC) value of a battery is equal to or lower than a predetermined value and thus the battery is chargeable.

The increasing or decreasing of the vehicle speed may further include when the SOC value of the battery is equal to or lower than a predetermined value as a result of the determination in the second SOC investigation operation, determining a regenerative torque according to a target decrease speed and controlling the MHSG to output the determined regenerative torque.

The increasing or decreasing of the vehicle speed may further include when the SOC value of the battery is greater than the predetermined value as a result of the determination of the second SOC investigation operation, determining whether a brake negative pressure is in a normal state.

The increasing or decreasing of the vehicle speed may further include when the control unit determines that the brake negative pressure is in an abnormal state, releasing the SSC mode, turning on the engine, and securing a brake negative pressure.

The increasing or decreasing of the vehicle speed may further include: when the control unit determines that the brake negative pressure is in the normal state, determining whether an Electronic Stability Control (ESC) system is in a normal state; and when the ESC system is determined by the control unit to be in the normal state, performing an ESC braking control.

Various aspects of the present invention are directed to providing an apparatus of controlling a mild hybrid electric vehicle, the apparatus including: a detecting unit configured to output at least one detection signal among a signal input through a driver interface, a vehicle speed signal, a front distance signal, an uphill/downhill signal, an accelerator pedal detection signal, and a brake pedal detection signal; and a control unit electrically-connected to the detecting unit and configured to receive the detection signal, determine whether a cruise mode is set and the vehicle enters a Start Stop Control (SSC) mode, interrupt a supply of fuel to an engine when the cruise mode and the SSC mode are applied, and turn off the engine, in which the control unit determines a necessity of an acceleration control or a braking control based on the detection signal, and increases or decreases a vehicle speed by controlling the engine, a Mild Hybrid Starter Generator (MHSG), or an Electronic Stability Control (ESC) according to a result of the determination.

When a gradient of a road on which the vehicle is travelling is equal to or greater than a predetermined angle, the control unit may determine that the acceleration control is required.

When the acceleration control is determined by the control unit to be required, the control unit may determine whether a state of charge (SOC) value of a battery is greater than a predetermined value and thus the battery is dischargeable, and when the SOC value of the battery is greater than a predetermined value, the control unit may determine a compensation torque according to a target increase speed and control the MHSG to output the determined compensation torque.

When the SOC value of the battery is equal to or lower than a predetermined value, the control unit may release the SSC mode, determine the fuel amount according to the target increase speed, inject fuel according to the determined fuel amount, and turn on the engine.

When the braking control is determined by the control unit to be required, the control unit may determine whether an SOC value of a battery is equal to or lower than a predetermined value and thus the battery is chargeable, and when the SOC value of the battery is equal to or lower than the predetermined value, the control unit may determine a regenerative torque according to a target decrease speed and control the MHSG to output the determined regenerative torque.

When the SOC value of the battery is greater than a predetermined value, the control unit may determine whether a brake negative pressure is in a normal state, and when the control unit determines that the brake negative pressure is in an abnormal state, the control unit may release the SSC mode, turn on the engine, and secure a brake negative pressure.

When the brake negative pressure is greater than a predetermined value and thus is determined as a normal state, or a brake negative pressure is secured by the turn-on of the engine, the control unit may investigate whether an ESC system is in a normal state, and when the ESC system is determined by the control unit to be in the normal state, the control unit may perform an ESC braking control.

When the cruise mode and the SSC mode are simultaneously applied while a 48 V mild hybrid vehicle is travelling, the present invention first performs an increase/decrease in a vehicle speed through the MHSG, solving a feeling of delay.

The present invention substantially determines ESC brake braking or MHSG regenerative braking based on an SOC value of a battery and inspects a brake negative pressure state and a state of an ESC system before the ESC brake braking, improving reliability in a braking control.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, an exemplary embodiment included in the exemplary embodiment will be described in detail with reference to the accompanying drawings, and the same or similar elements will be designated by the same or similar reference numerals, and the overlapping description thereof will be omitted. Suffixes, "module" and "unit" for a constituent element used for the description below are provided or mixed in consideration of only easiness of the writing of the specification, and the suffix itself does not have a discriminated meaning or role. Furthermore, in describing the exemplary embodiment included in the present invention, when it is determined that detailed description relating to well-known functions or configurations may make the subject matter of the exemplary embodiment included in the present invention unnecessarily ambiguous, the detailed description will be omitted. Furthermore, the accompanying drawings are provided for helping to easily understand exemplary embodiments included in the exemplary embodiment, and the technical spirit included in the exemplary embodiment of the present invention is not limited by the accompanying drawings, and it will be appreciated that the present invention includes all of the modifications, equivalent matters, and substitutes included in the spirit and the technical scope of the present invention.

Terms including an ordinary number, such as first and second, are used for describing various constituent elements, but the constituent elements are not limited by the terms. The terms are used only to discriminate one constituent element from another constituent element.

It may be understood that when one constituent element is referred to as being "coupled to" or "connected to" another constituent element, one constituent element may be directly coupled to or connected to the other constituent element, but intervening elements may also be present. In contrast, when one constituent element is "directly coupled to" or "directly connected to" another constituent element, it may be understood that there are no intervening element present.

In the present application, it will be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance.

Figure 1:
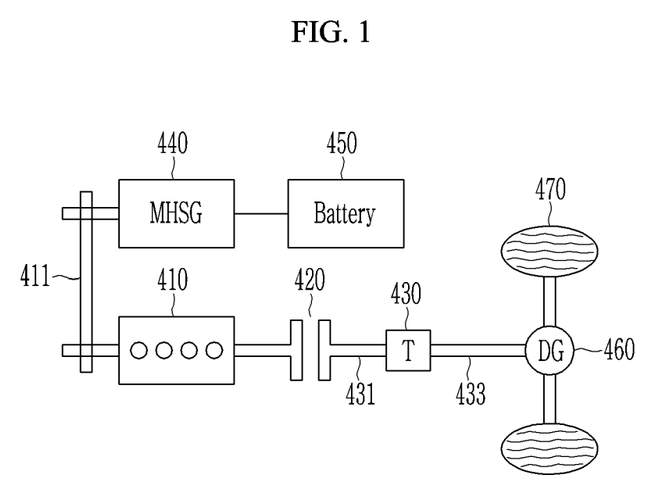
FIG. 1 is a block diagram illustrating a mild hybrid electric vehicle according to an exemplary embodiment of the present invention.
Figure 2:
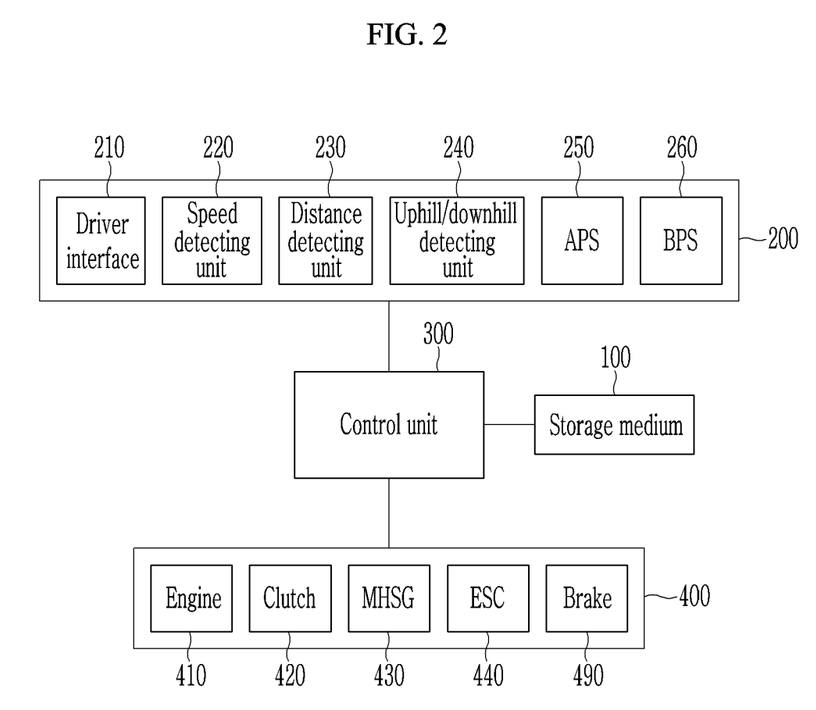
FIG. 2 is a block diagram for describing a portion of a configuration of an apparatus of controlling the mild hybrid electric vehicle according to an exemplary embodiment of the present invention.

FIG. 1 is a block diagram illustrating a mild hybrid electric vehicle according to an exemplary embodiment of the present invention, and FIG. 2 is a block diagram for describing a portion of a configuration of an apparatus of controlling the mild hybrid electric vehicle according to an exemplary embodiment of the present invention.

Referring to FIG. 1, the mild hybrid electric vehicle includes an engine 410, a clutch 420, a transmission 430, a Mild Hybrid Starter Generator (MHSG) 440, a battery 450, a differential gear system 460, and wheels 470.

In the power transmission of the mild hybrid electric vehicle, a torque generated in the engine 410 is transmitted to an input shaft 431 of the transmission 430 and a torque output from an output shaft 433 of the transmission 430 is transmitted to an axle via the differential gear system 460. The axle rotates the wheels 470, so that the mild hybrid electric vehicle travels by the torque generated in the engine 410.

The engine 410 combusts fuel and air and converts chemical energy to mechanical energy. A combustion torque of the engine 410 may be generated by controlling ignition timing, the air amount, the fuel amount, an air-fuel ratio, and the like.

The clutch 420 is mounted between the engine 410 and the transmission 430, and fastens or separates the engine 410 and the transmission 430 and selectively connects the engine 410 and the transmission 430. For example, the clutch 420 selectively transmits the torque generated in the engine 410 to the transmission 430.

The transmission 430 changes a gear ratio according to a travelling state of the mild hybrid electric vehicle to implement a gear shifting to a target gear shifting stage.

The MHSG 440 may operate the engine 410 or generate electricity by power of the engine 410. For example, the MHSG 440 may assist the torque of the engine 410. Accordingly, the mild hybrid electric vehicle may use the torque of the MHSG 440 as auxiliary power while using the combustion torque of the engine 410 as main power. In FIG. 1, the MHSG 440 is connected to the engine 410 through a belt 411, but is not limited thereto, and the MHSG 440 may be located between the engine 410 and the clutch 420 or the clutch 420 and the differential gear system 460.

The battery 450 may supply electricity to the MHSG 440 or may be charged with electricity which is collected through the MHSG 440 in a regenerative braking mode. For example, the battery 450 may include a 48 V battery, a Low voltage DC-DC Converter (LDC) which converts a voltage supplied from the 48 V battery to a low voltage, and a 12 V battery which supplies a lower voltage to an electronic load using a lower voltage.

Referring to FIG. 2, a control device of the mild hybrid electric vehicle includes a storage medium 100, a detecting unit 200, a control unit 300, and a controlled unit 400.

The storage medium 100 stores a method or programs of controlling acceleration or deceleration of a vehicle in a situation where a cruise mode and a Start Stop Control (SSC) mode (hereinafter, the SSC mode) are simultaneously applied.

The detecting unit 200 may include a driver interface 210, a speed detecting unit 220, a distance detecting unit 230, an uphill/downhill detecting unit 240, an Accelerator Pedal Position Sensor (APS) 250, and a Brake Pedal Position Sensor (BPS) 260. For example, the detecting unit 200 may output a signal input through the driver interface 210, a vehicle speed signal, a front distance signal, an uphill/ downhill signal, and at least one of an accelerator pedal detection signal and a brake pedal detection signal to the control unit 300.

The driver interface 210 interfaces with a driver, and transmits the signals input according to a manipulation of the driver to the control unit 300. For example, the driver interface 210 may include a button for setting/releasing the cruise mode of the vehicle, a keypad, a microphone, a touch screen, and the like. The driver may set/release the cruise mode or set a target speed through the driver interface 210.

The speed detecting unit 220 detects a speed of the vehicle and transmits a detected vehicle speed signal to the control unit 300. For example, the speed detecting unit 220 may include a speed sensor.

The distance detecting unit 230 detects a distance to a front vehicle and transmits a detected front distance signal to the control unit 300. For example, the distance detecting unit 230 may detect a distance to a front vehicle by use of an Advanced Driver Assistance system (ADAS) sensor, an Intelligent Transport System (ITS) device, and the like.

The uphill/downhill detecting unit 240 determines whether a gradient of a road on which the vehicle is travelling is uphill or downhill, and transmits an uphill signal or a downhill signal to the control unit 300. For example, the uphill/downhill detecting unit 240 may include an acceleration sensor, and when an acceleration of the vehicle is less than a predetermined reference value, the uphill/downhill detecting unit 240 may determine that a road is uphill, and when an acceleration of the vehicle is equal to or greater than the predetermined reference value, the uphill/downhill detecting unit 240 may determine that the road is downhill. For another example, the uphill/downhill detecting unit 240 may include a navigation system, and determine whether a gradient of a road on which the vehicle is travelling corresponds to uphill or downhill based on a Global Positioning System (GPS).

The APS 250 detects whether an accelerator pedal is operated, and transmits an accelerator pedal detection signal to the control unit 300.

The BPS 260 detects whether a brake is operated, and transmits a brake pedal detection signal to the control unit 300.

The control unit 300 may receive a detection signal from the detecting unit 200 and determine whether the cruise mode is set and the vehicle enters the SSC mode, and when the cruise mode and the SSC mode are applied, the control unit 300 may interrupt the supply of fuel to the engine 410 and turn off the engine 410. For example, the control unit 300 may include an Electronic Control Unit (ECU).

When a vehicle speed is decreased to a predetermined target speed or lower in the state where the cruise mode is set, the control unit 300 may increase the vehicle speed by an acceleration control, and when the vehicle speed is increased to the predetermined target speed or greater, the control unit 300 may decrease the vehicle speed by a braking control to maintain the predetermined target speed. Hereinafter, the present invention will be described on the premise of the cruise mode in which the predetermined vehicle speed is maintained, but is not limited thereto, and the present invention may also be applied in the SSC mode in which the predetermined vehicle speed and a distance to a front vehicle are maintained.

First, when the engine 410 is in an off state, the control unit 300 supplies fuel to drive the engine 410, and when the engine 410 has been already driven, the control unit 300 maintains a current on state.

Next, the control unit 300 determines whether the cruise mode is set according to a signal input through the driver interface 210. For example, the control unit 300 may determine whether the cruise mode is set according to a signal transmitted through an input of a button mounted to a steering wheel and the like, a keypad, a microphone, a touch screen, and the like.

When the cruise mode is set, the control unit 300 may determine whether a predetermined SSC entrance condition is satisfied and determine whether the vehicle enters the SSC mode. For example, when the accelerator pedal and the brake pedal are not operated and a speed of the vehicle is equal to or greater than a predetermined speed, the control unit 300 may determine that the SSC entrance condition is satisfied based on an accelerator pedal detection signal, a brake pedal detection signal, and a vehicle speed signal.

Next, when the predetermined SSC entrance condition is not satisfied, the control unit 300 determines that the vehicle fails to enter the SSC mode and terminates a cruise-SSC combination control. In the instant case, the engine 410 maintains the on state.

Next, when the predetermined SSC entrance condition is satisfied and the vehicle enters the SSC mode, the control unit 300 interrupts the supply of fuel to the engine 410 (fuel cut) to turn off the engine 410, and controls the clutch 420 to interrupt the transmission of power to the transmission 430 (clutch off).

Next, in the state where the cruise mode and the SSC mode are simultaneously applied, the control unit 300 determines whether an acceleration control is required based on at least one detection signal among the signal input through the driver interface 210, and a vehicle speed signal, a front distance signal, and an uphill/downhill signal transmitted from the detecting unit 200.

For example, when a gradient of a road on which the vehicle is travelling corresponds to an uphill environment having a predetermined angle or more in the state where the cruise mode is set, the vehicle speed may be decreased to the predetermined target speed or lower, and the control unit 300 may determine that the acceleration control is required to reach the predetermined target speed. However, the case where the vehicle speed is decreased is not limited to the foregoing example, and may include various situations incurable during the operation of the vehicle.

Next, when the acceleration control is determined by the control unit to be required, the control unit 300 investigates whether a State of charge (SOC) value of the battery 450 is enough, i.e., greater than a predetermined value, and the battery 450 is dischargeable. In the SSC mode, the engine 410 is in the off state, so that the control unit 300 investigates whether it is possible to increase the vehicle speed with a compensation torque of the MHSG 440 by discharge of the battery 450.

Next, when the SOC value of the battery 450 is not enough, i.e., equal to or lower than the predetermined value and thus the battery 450 is not dischargeable, it is impossible to increase the vehicle speed through the MHSG 440, so that the control unit 300 releases the SSC mode, determines the fuel amount according to a target increase speed, injects fuel to the engine according to the determined fuel amount, and turns on the engine 410. Accordingly, the vehicle speed is increased with a torque of the engine 410.

Next, when the SOC value of the battery 450 is enough, the control unit 300 determines a compensation torque according to the target increase speed and controls the MHSG 440 to output the determined compensation torque.

Accordingly, the vehicle speed is increased through the monitoring of the MHSG 440.

When the acceleration control is not required, the control unit 300 determines whether a braking control is required based on at least one detection signal among the signal input through the driver interface 210, and a vehicle speed signal, a front distance signal, and an uphill/downhill signal transmitted from the detecting unit 200.

For example, when a gradient of a road on which the vehicle is travelling corresponds to a downhill environment having the predetermined angle or lower in the state where the cruise mode is set, the vehicle speed may be increased to the predetermined target speed or greater, and the control unit 300 may determine that the braking control is required to reach the predetermined target speed. However, the case where the vehicle speed is increased is not limited to the foregoing example, and may include various situations incurable during the operation of the vehicle.

Next, when the braking control is not required, the control unit 300 re-investigates from the operation of investigating the necessity of the acceleration control.

Next, when the braking control is determined by the control unit to be required, the control unit 300 investigates whether the SOC value of the battery 450 is a chargeable state with regenerative braking of the MHSG 440. When the regenerative braking of the MHSG 440 exists in the state where the SOC value of the battery 450 is enough, a problem, such as deterioration of the battery, may occur, so that the control unit 300 does not perform the regenerative braking of the MHSG 440 when the SOC value of the battery 450 is enough.

Next, when the SOC value of the battery 450 is not enough, the control unit 300 determines a regenerative torque according to the target decrease speed and controls the MHSG 440 to output the determined regenerative torque. Accordingly, the vehicle speed is decreased due to the regenerative braking of the MHSG 440 and the battery 450 is charged.

Next, when the SOC value of the battery 450 is enough, the control unit 300 determines whether a brake negative pressure is in a normal state. When the SOC value of the battery 450 is enough, it is impossible to decrease the vehicle speed through the MHSG 440, so that the braking control through the ESC 440 or the brake 490 is required. In the instant case, the control unit 300 verifies the normal state of the brake negative pressure on the premise of the necessity of the braking control through the ESC 440 or the brake 490

Next, when the brake negative pressure is not sufficient, so that it is not determined that the brake negative pressure is in the normal state, even though the driver presses the brake 490, it is impossible to accurately recognize the braking intention of the driver, so that the control unit 300 releases the SSC mode and turns on the engine 410 to secure the brake negative pressure.

Next, when the brake negative pressure is sufficient, so that it is determined that the brake negative pressure is in the normal state, or the brake negative pressure is secured due to the turn-on of the engine 410, the control unit 300 investigates a normal state of an Electronic Stability Control (ESC) system. The ESC system is a device configured for maintaining braking/steering safety by controlling braking force of a wheel and a torque of the engine 410 when a posture of the vehicle is unstable, and is operated even though the driver does not press the brake 490.

Next, when the ESC system is determined by the control unit to be in the normal state, the control unit 300 decreases the speed of the vehicle through the ESC braking control. Next, when the ESC system is in an abnormal state, the control unit 300 induces the driver to manipulate the brake 490 and decreases the speed of the vehicle.

Figure 3:
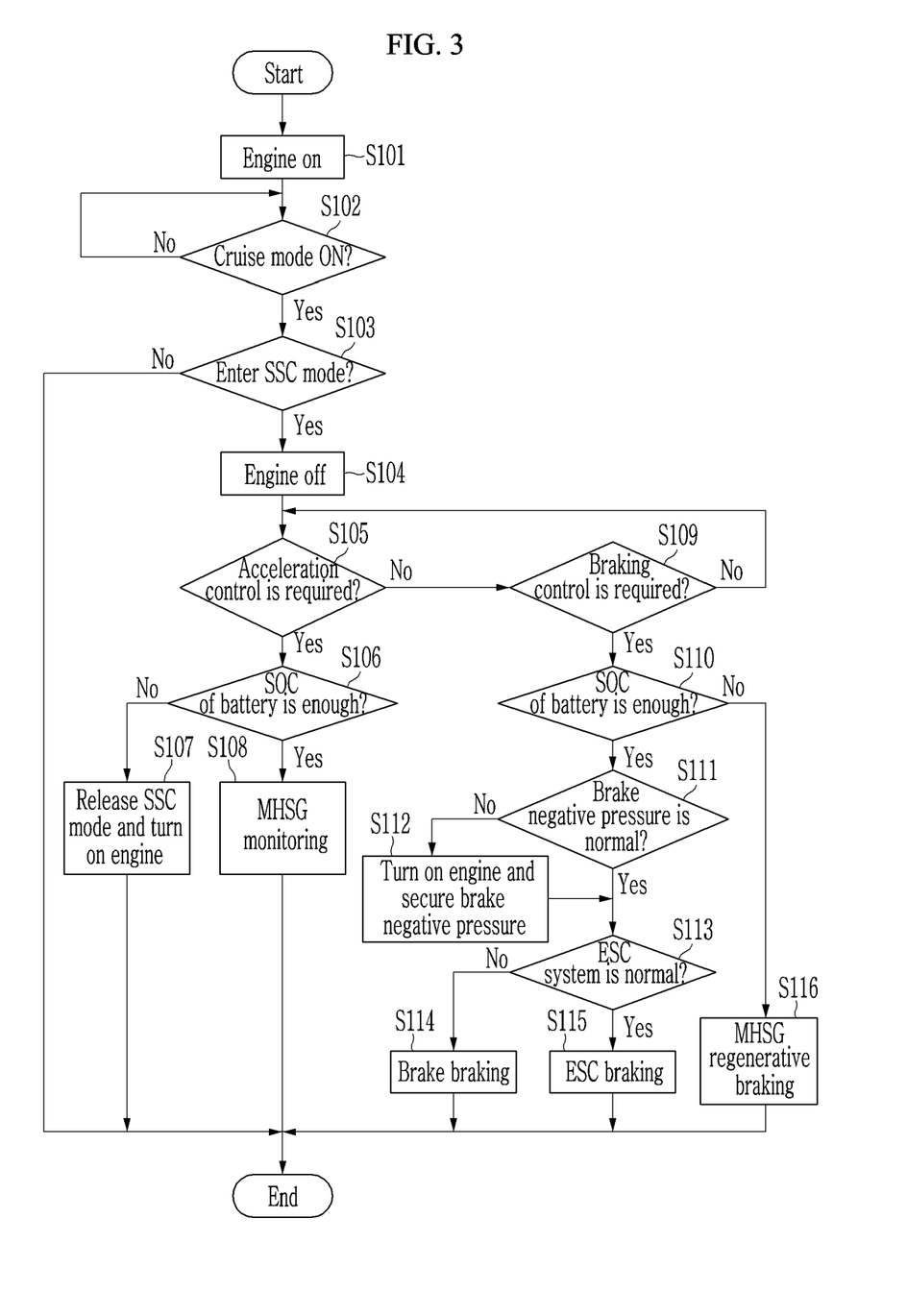
FIG. 3 is a flowchart for describing a method of controlling acceleration or deceleration of a vehicle in a situation where a cruise mode and a Start Stop Control (SSC) mode are simultaneously applied in the mild hybrid electric vehicle according to an exemplary embodiment of the present invention.

FIG. 3 is a flowchart for describing a method of controlling acceleration or deceleration of a vehicle in which the cruise mode and the SSC mode are simultaneously applied in the mild hybrid electric vehicle according to an exemplary embodiment of the present invention.

First, referring to FIG. 3, when the engine 410 is in an off state, the control unit 300 supplies fuel to drive the engine 410, and when the engine 410 has been already driven, the control unit 300 maintains a current on state (S101).

Next, the control unit 300 determines whether the cruise mode is set according to a signal input through the driver interface 210 (S102). For example, the control unit 300 may determine whether the cruise mode is set according to a signal transmitted through an input of a button mounted to a steering wheel and the like, a keypad, a microphone, a touch screen, and the like.

When the cruise mode is set (YES in S102), the control unit 300 may determine whether a predetermined SSC entrance condition is satisfied and determine whether the vehicle enters the SSC mode (S103).

For example, when the accelerator pedal and the brake pedal are not operated and a speed of the vehicle is equal to or greater than a predetermined speed, the control unit 300 may determine that the SSC entrance condition is satisfied based on an accelerator pedal detection signal, a brake pedal detection signal, and a vehicle speed signal.

Next, when the predetermined SSC entrance condition is not satisfied (NO in S102), the control unit 300 determines that the vehicle fails to enter the SSC mode and terminates a cruise-SSC combination control. In the instant case, the engine 410 maintains the on state.

Next, when the predetermined SSC entrance condition is satisfied and the vehicle enters the SSC mode (YES in S103), the control unit 300 interrupts the supply of fuel to the engine 410 (fuel cut) to turn off the engine 410, and controls the clutch 420 to interrupt the transmission of power to the transmission 430 (clutch off) (S104).

Next, in the state where the cruise mode and the SSC mode are simultaneously applied, the control unit 300 determines whether an acceleration control is required based on at least one detection signal among the signal input through the driver interface 210, and a vehicle speed signal, a front distance signal, and an uphill/downhill signal transmitted from the detecting unit 200 (S105).

For example, when a gradient of a road on which the vehicle is travelling corresponds to an uphill environment having a predetermined angle or more in the state where the cruise mode is set, the vehicle speed may be decreased to the predetermined target speed or lower, and the control unit 300 may determine that the acceleration control is required to reach the predetermined target speed. However, the case where the vehicle speed is decreased is not limited to the foregoing example, and may include various situations incurable during the operation of the vehicle.

Next, when the acceleration control is determined by the control unit to be required (YES in S105), the control unit 300 investigates whether an SOC value of the battery 450 is enough and the battery 450 is dischargeable (S106). In the SSC mode, the engine 410 is in the off state, so that the control unit 300 investigates whether it is possible to increase the vehicle speed with a compensation torque of the MHSG 440 by discharge of the battery 450.

Next, when the SOC value of the battery 450 is not enough and thus the battery 450 is not dischargeable, it is impossible to increase the vehicle speed through the MHSG 440 (NO in S106), so that the control unit 300 releases the SSC mode, determines the fuel amount according to a target increase speed, injects fuel to the engine according to the determined fuel amount, and turns on the engine 410 (S107). Accordingly, the vehicle speed is increased with a torque of the engine 410.

Next, when the SOC value of the battery 450 is enough (YES in S106), the control unit 300 determines a compensation torque according to a target increase speed and controls the MHSG 440 to output the determined compensation torque (S108). Accordingly, the vehicle speed is increased through the monitoring of the MHSG 440.

When the acceleration control is not required (NO in S105), the control unit 300 determines whether a braking control is required based on at least one detection signal among the signal input through the driver interface 210, and a vehicle speed signal, a front distance signal, and an uphill/downhill signal transmitted from the detecting unit 200 (S109).

For example, when a gradient of a road on which the vehicle is travelling corresponds to a downhill environment having the predetermined angle or lower in the state where the cruise mode is set, the vehicle speed may be increased to the predetermined target speed or greater, and the control unit 300 may determine that the braking control is required to reach the predetermined target speed. However, the case where the vehicle speed is increased is not limited to the foregoing example, and may include various situations incurable during the operation of the vehicle.

Next, when the braking control is not required (NO in S109), the control unit 300 re-investigates from the operation of investigating the necessity of the acceleration control.

Next, when the braking control is required (YES in S109), the control unit 300 investigates whether the SOC value of the battery 450 is a chargeable state with regenerative braking of the MHSG 440 (S110). When the regenerative braking of the MHSG 440 exists in the state where the SOC value of the battery 450 is enough, a problem, such as deterioration of the battery, may occur, so that the control unit 300 does not perform the regenerative braking of the MHSG 440 when the SOC value of the battery 450 is enough.

Next, when the SOC value of the battery 450 is not enough (NO in S110), the control unit 300 determines a regenerative torque according to a target decrease speed and controls the MHSG 440 to output the determined regenerative torque (S116). Accordingly, the vehicle speed is decreased due to the regenerative braking of the MHSG 440 and the battery 450 is charged.

Next, when the SOC value of the battery 450 is enough (YES in S110), the control unit 300 determines whether a brake negative pressure is in a normal state (S111). When the SOC value of the battery 450 is enough, it is impossible to decrease the vehicle speed through the MHSG 440, so that the braking control through the ESC 440 or the brake 490 is required. In the instant case, the control unit 300 verifies the normal state of the brake negative pressure on the premise of the necessity of the braking control through the ESC 440 or the brake 490.

Next, when the brake negative pressure is not sufficient, so that it is not determined that the brake negative pressure is in the normal state (NO in S111), even though the driver presses the brake 490, it is impossible to accurately recognize the braking intention of the driver, so that the control unit 300 releases the SSC mode and turns on the engine 410 to secure the brake negative pressure (S112).

Next, when the brake negative pressure is sufficient, so that it is determined that the brake negative pressure is in the normal state (YES in S111) or the brake negative pressure is secured due to the turn-on of the engine 410, the control unit 300 investigates a normal state of an Electronic Stability Control (ESC) system (S113). The ESC system is a device configured for maintaining braking/steering safety by controlling braking force of a wheel and a torque of the engine 410 when a posture of the vehicle is unstable, and is operated even though the driver does not press the brake 490.

Next, when the ESC system is determined by the control unit to be in the normal state (YES in S113), the control unit 300 decreases the speed of the vehicle through the ESC braking control (S115). Next, when the ESC system is in an abnormal state (NO in S113), the control unit 300 induces the driver to manipulate the brake 490 and decreases the speed of the vehicle (S114).

In an exemplary embodiment of the present invention, the control unit refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control unit according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The control unit may be at least one microprocessor operated by a predetermined program which may include a series of commands for carrying out a method in accordance with various exemplary embodiments of the present invention.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method of controlling a vehicle, the method comprising:
   determining, by a control unit, whether a Start Stop Control (SSC) entrance condition is satisfied when a cruise mode is set;
   in a response that the SSC entrance condition is determined to be satisfied by the control unit to enter an SSC mode, interrupting, by the control unit, a supply of fuel to an engine and turning off the engine;
   monitoring, by the control unit, a vehicle speed, in which when the engine is turned off, the control unit is configured to determine whether an acceleration control or a braking control of the vehicle is required based on a detection signal transmitted from a detecting unit electrically-connected to the control unit; and
   increasing or decreasing, by the control unit, the vehicle speed by controlling the engine, a Mild Hybrid Starter Generator (MHSG), or an Electronic Stability Control (ESC) based on the monitoring of the vehicle speed.

2. The method of claim 1, wherein the monitoring of the vehicle speed includes:
   in a response that a gradient of a road on which the vehicle is travelling is equal to or greater than a predetermined angle, determining that the acceleration control is required.

3. The method of claim 2, wherein the increasing or decreasing of the vehicle speed includes:
   a first state of charge(SOC) investigation operation in which in a response that the acceleration control is determined by the control unit to be required, the control unit determines whether a state of charge (SOC) value of a battery is greater than a predetermined value and thus the battery is dischargeable.

4. The method of claim 3, wherein the increasing or decreasing of the vehicle speed further includes:
   in a response that the SOC value of the battery is greater than the predetermined value as a result of the determination in the first SOC investigation operation, determining a compensation torque according to a target increase speed and controlling the MHSG to output the determined compensation torque.

5. The method of claim 3, wherein the increasing or decreasing of the vehicle speed further includes:
   in a response that the SOC value of the battery is equal to or lower than the predetermined value as a result of the determination in the first SOC investigation operation, releasing the SSC mode, determining a fuel amount according to a target increase speed, injecting fuel to the engine according to the determined fuel amount, and turning on the engine.

6. The method of claim 2, wherein the increasing or decreasing of the vehicle speed further includes:
   a second SOC investigation operation in which in a response that the braking control is determined by the control unit to be required, the control unit is configured to determine whether a state of charge (SOC) value of a battery is equal to or lower than a predetermined value and thus the battery is chargeable.

7. The method of claim 6, wherein the increasing or decreasing of the vehicle speed further includes:
   in a response that the SOC value of the battery is equal to or lower than the predetermined value as a result of the determination in the second SOC investigation operation, determining a regenerative torque according to a target decrease speed and controlling the MHSG to output the determined regenerative torque.

8. The method of claim 6, wherein the increasing or decreasing of the vehicle speed further includes:
   in a response that the SOC value of the battery is greater than the predetermined value as a result of the determination of the second SOC investigation operation, determining whether a brake negative pressure is in a normal state.

9. The method of claim 8, wherein the increasing or decreasing of the vehicle speed further includes:
   in a response that the control unit determines that the brake negative pressure is equal to or lower than a predetermined pressure value and thus in an abnormal state, releasing the SSC mode, turning on the engine, and securing the brake negative pressure.

10. The method of claim 8, wherein the increasing or decreasing of the vehicle speed further includes:
    in a response that the control unit determines that the brake negative pressure is greater than a predetermined pressure value and thus is in the normal state, determining whether an Electronic Stability Control (ESC) system is in a normal state; and
    in a response that the ESC system is determined by the control unit to be in the normal state, performing an ESC braking control.

11. An apparatus of controlling a vehicle, the apparatus comprising:
    a detecting unit configured to output at least one detection signal among a vehicle speed signal, a front distance signal, an uphill/downhill signal, an accelerator pedal detection signal, and a brake pedal detection signal; and
    a control unit electrically-connected to the detecting unit and configured to receive the at least one detection signal, determine whether a cruise mode is set and the vehicle enters a Start Stop Control (SSC) mode, interrupt a supply of fuel to an engine when the cruise mode and the SSC mode are applied, and turn off the engine,
    wherein the control unit is configured to determine whether an acceleration control or a braking control is required based on the at least one detection signal, and increases or decreases a vehicle speed by controlling the engine, a Mild Hybrid Starter Generator (MHSG), or an Electronic Stability Control (ESC) according to a result of determining whether the acceleration control or the braking control is required.

12. The apparatus of claim 11, wherein in a response that a gradient of a road on which the vehicle is travelling is equal to or greater than a predetermined angle, the control unit is configured to determine that the acceleration control is required.

13. The apparatus of claim 11, wherein in a response that the acceleration control is determined by the control unit to be required, the control unit is configured to determine whether a state of charge (SOC) value of a battery is greater than a predetermined value and thus the battery is dischargeable, and when the SOC value of the battery is greater than the predetermined value, the control unit is configured to determine a compensation torque according to a target increase speed and controls the MHSG to output the determined compensation torque.

14. The apparatus of claim 13, wherein in a response that the SOC value of the battery is equal to or lower than the predetermined value, the control unit is configured to release the SSC mode, is configured to determine a fuel amount according to the target increase speed, injects fuel to the engine according to the determined fuel amount, and turns on the engine.

15. The apparatus of claim 11, wherein in a response that the braking control is determined by the control unit to be required, the control unit is configured to determine whether an SOC value of a battery is equal to or lower than a predetermined value and thus the battery is chargeable, and in a response that the SOC value of the battery is equal to or lower than the predetermined value, the control unit is configured to determine a regenerative torque according to a target decrease speed and controls the MHSG to output the determined regenerative torque.

16. The apparatus of claim 15, wherein in a response that the SOC value of the battery is greater than the predetermined value, the control unit is configured to determine whether a brake negative pressure is in a normal state, and in a response that the control unit determines that the brake negative pressure is in an abnormal state, the control unit is configured to release the SSC mode, turns on the engine, and secures the brake negative pressure.

17. The apparatus of claim 16, wherein in a response that the brake negative pressure is greater than a predetermined pressure value and thus is determined as the normal state, or the brake negative pressure is secured by the turn-on of the engine, the control unit is configured to investigate whether an ESC system is in a normal state, and in a response that the ESC system is determined by the control unit to be in the normal state, the control unit is configured to perform an ESC braking control.

18. The apparatus of claim 16, wherein, in a response that the control unit determines that the brake negative pressure is equal to or lower than a predetermined pressure value and thus in the abnormal state, the control unit is configured to release the SSC mode, turns on the engine, and secures the brake negative pressure.

* * * * *